Figures 1, 2:
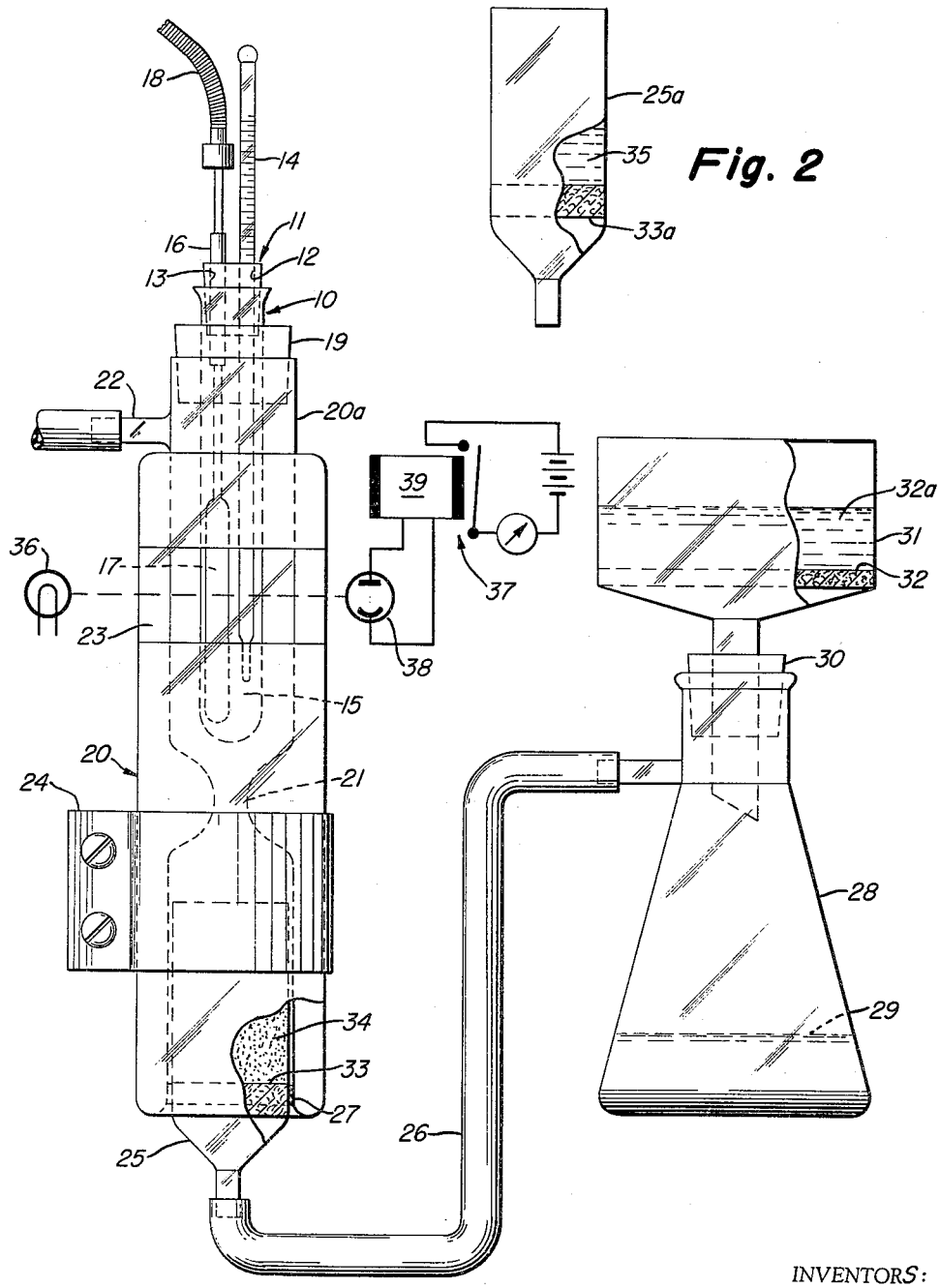

INVENTORS:
Richard E. Rayford
Robert E. Rezny
BY Everett A. Johnson
ATTORNEY

United States Patent Office 3,008,324
Patented Nov. 14, 1961

3,008,324
LOW TEMPERATURE CLOUD POINT APPARATUS
Richard E. Rayford, Schererville, and Robert E. Rezny, Highland, Ind., assignors to Standard Oil Company, Chicago, Ill., a corporation of Indiana
Filed Sept. 25, 1957, Ser. No. 686,173
4 Claims. (Cl. 73—17)

This invention relates to apparatus for determining liquid miscibilities as indicated by the cloud point.

In refinery operations, such as solvent dewaxing processes, it is desired to determine cloud points at low temperatures to obtain desired liquid miscibility information and low melting wax cloud points. When such cloud points are determined at relatively high temperatures, i.e. above about 32° F., frost is not a problem and most generally air at room temperature can be used as the cooling medium. With the desire to determine cloud points at low temperatures, i.e. −20° F. to +32° F., operating difficulties, such as frost, are encountered. Apparatus has heretofore been developed for measuring such low temperature cloud points but such prior apparatus has been considered too complex and not sufficiently flexible to be adapted for routine low temperature cloud point determinations.

It is, therefore, a primary object of this invention to provide an apparatus which is adapted for low temperature liquid miscibility determinations. A further object of the invention is to provide such apparatus which is adaptable for use on a wide range of mixed liquids and which is relatively simple in operation. An additional object is to provide a system wherein the difficulties heretofore encountered in prior apparatus are minimized or eliminated. These and other objects of the invention will become apparent as our description thereof proceeds.

Briefly, according to our invention, we provide an apparatus for measuring cloud points at very low temperatures where dehydrated gasiform fluid is used as the cooling and warming media and wherein a simple, though effective, apparatus permits the determinations of cloud points without interference from frost.

Further advantages and details of our invention will be described by reference to the accompanying drawings which illustrate schematically a preferred embodiment of the invention.

Referring to the drawings, the sample to be tested is poured into a test tube 10 fitted with a two-hole cork stopper 11. Through the bore 12, a thermometer 14 extends into the sample 15 and bore 13 is fitted with a bearing 16. A paddle stirrer 17 extends through the bearing 16 into the sample within the test tube 10 and is driven by a variable speed motor (not shown) through a flexible coupling 18.

The test cell 10 containing the test sample is fitted into a second cork stopper 19 which closes the upper end of the conduit or jacket 20, having a constriction 21 near its center. This constriction 21 serves to direct or baffle the flow of air upwardly and around the test tube 10. The jacket 20 is open at both ends and at the upper end, below the bottom of the second stopper 19, there is an outlet duct 22 to which a vacuum source (not shown) can be applied for flowing the cooling medium through the jacket 20.

The jacket 20 has a double wall evacuated to provide the required heat insulation. If desired, the inner surfaces of the double wall of jacket 20 can be silvered to provide additional insulation. If this arrangement is used, then windows 23 are provided so that light can shine entirely through the apparatus and the test sample observed. For most installations, however, we have found that the coating of silver may be omitted.

The apparatus comprising the test tube 10 in the jacket 20 is mounted on a suitable support 24 leaving sufficient working space below the jacket 20 so that a glass funnel 25 and attached tubing 26 can be inserted and removed from the lower end of the jacket 20. The joint where the funnel 25 fits into the lower end of the jacket 20 is made air-tight either with a rubber gasket 27 as shown in the drawings or with a tapered ground glass joint. The glass funnel 25 is fitted with a glass wool plug 33 and filled with chipped Dry Ice (solidified $CO_2$) 34, and projected upwardly into the lower end of the jacket 20 as shown in the drawing.

The small end of the funnel 25 is attached by the rubber tubing 26 to a flask 28 which contains a layer of calcium chloride 29 about one inch in depth and is fitted with a cork stopper 30 through which extends a large Buchner funnel 31. The funnel 31 contains a very thin layer 32 of glass wool and is filled with a layer 32a of calcium chloride.

In addition to the apparatus components just described, we provide an additional glass funnel 25a of FIGURE 2 which is fitted with a plug of glass wool 33a and filled with a mass 35 of calcium chloride.

The test is run as follows: The apparatus is assembled as shown in FIGURE 1 with the sample to be tested placed in the test tube 10. Agitation is begun by means of the stirrer 17 and the vacuum is applied to the vacuum line 22. This draws air through the calcium chloride 32a in the Buchner funnel 31 where it is dehydrated, through the Dry Ice in funnel 25 where it is chilled, and through the jacket 20 where it is directed by means of baffle 21 around and about test tube 10, thereby cooling the test sample.

A light source 36 is placed behind the apparatus and the beam of light is directed through the apparatus and the test sample in the cell 10. Cooling is continued by drawing the dehydrated and cooled air through the apparatus via line 22 until the cloud point of the sample under test appears. The cloud point is identified by a darkening or clouding of the test sample which may be observed visually or detected by means of a photoelectric system 37. The temperature at which the cloud point appears is measured by the thermometer 14. However, we contemplate that the temperature may be measured by a recording thermocouple system (not shown) and that in the photoelectric detection system 37 a photocell 38 may be used to actuate a relay 39 or other means for indicating that the cloud point has been reached. If desired, a second test tube containing a standard may be used for comparison, either visually or photoelectrically, in making the routine determinations on cell 10. In any event, the formation of the cloud interrupts the light beam to actuate the indicator.

We have used this apparatus in the manner described to obtain miscibility and low melting wax cloud temperatures of a wide variety of liquids. We have mixed liquid and wax cloud points of oil, methyl ethyl ketone, and toluene mixtures. Tests have been run on oils ranging from merely light lubricating oils (54 SSU at 100° F.) to bright stock which is a residual oil. Temperatures as low as −40° F. have been attained when necessary.

It is often desirable to check the cloud point by measuring the temperature at which the cloud disappears on warming the sample. To do this, the funnel 25 is replaced by the duplicate funnel 25a filled with calcium chloride 35. If a slow rate of warming is desired, the vacuum may be left off during the warming cycle. However, more rapid warming can be achieved by applying the vacuum to line 22 as before, thus directing warm dehydrated air around and over the test tube 10.

Although we have proposed a system which includes dehydrating atmospheric air, it should be understood that we contemplate using bottled gases, such as nitrogen, which are substantially free of water vapor. Similarly, in some installations we may use compressed $CO_2$ directly, obtaining refrigerating effect by expansion of the $CO_2$.

From the above it will be apparent that we have attained the objects of our invention. However, it is contemplated that modifications can be made in the apparatus and the mode of operating the apparatus without departing from the spirit and scope of the invention. As indicated, we may provide automatic means for detecting the cloud point. We may also use other desiccants than calcium chloride, such as silica gel and the like, and may use other sources of cooling even though the solidified $CO_2$ is preferred as described in connection with the illustrative embodiment of the invention.

What we claim is:

1. Low temperature cloud point apparatus comprising in combination a vertically elongated conduit open at its upper and lower ends, an evacuated insulation means about said conduit over substantially the entire length thereof, at least a portion of said evacuated insulation means being transparent and thereby providing visual or optical access into said conduit, a constriction providing a baffle means in said conduit at about the mid-point of its length, a stopper means closing the upper end of said conduit, said stopper means supporting a glass test tube within the region of the conduit above said baffle means, outlet means adjacent the upper end of said conduit below said stopper means, gasiform fluid outlet means from said conduit adjacent said stopper means, a second stopper means in said test tube, temperature responsive means projecting through said second stopper means into a lower portion of said test tube, agitator means extending through said second stopper means and projecting into said test tube to a lower portion thereof, removable means for cooling the lower portion of said conduit below said baffle means, said removable means for cooling including a funnel-like vessel adapted to confine a quantity of solidified carbon dioxide therein, means for providing an air-tight seal between the said conduit and the outer wall of said vessel, second conduit means for delivering a stream of dehydrated air to the lower end of said vessel, vacuum flask means discharging into said second conduit means, and Buchner funnel means in said vacuum flask means containing a desiccant and through which air is drawn, circulated through said cooling means, over and about said test tube, and vented from said conduit via said outlet means.

2. Low temperature cloud point apparatus comprising in combination a vertically elongated, generally tubular, double-walled chamber, said chamber having upper and lower open ends, at least a portion of said chamber being transparent and thereby affording visual or optical access therein, a flow directing baffle in said chamber intermediate the said open ends, removable cooling means comprising a funnel-like vessel projected upwardly within said tubular chamber and extending to a point below said baffle, said vessel containing a quantity of solid coolant, means for supporting said coolant within said vessel, means providing an airtight seal between the said chamber and said vessel, conduit means delivering a stream of dehydrated air to the lower end of said vessel and for flowing such air upwardly therethrough, a transparent test cell supported within and projecting downwardly from the upper end of said chamber, annular stopper means supporting said test cell within said chamber and providing an airtight seal between said chamber and said cell, said test cell being elongated and having its lower end adjacent the said baffle, an outlet from said chamber near the upper end thereof, temperature responsive means within said test cell immersed within the material under test, agitator means within said cell, and stopper means closing the upper end of said cell and supporting said temperature responsive means and said agitator means.

3. The low temperature cloud point apparatus of claim 2 which includes photoelectric means embracing said cell whereby the occurrence of the cloud point is detected, said photoelectric means being adapted to actuate a temperature responsive indicator upon reaching the cloud point.

4. The low temperature cloud point apparatus of claim 1 which includes photoelectric means directed across said test tube whereby the occurrence of the cloud point is detected and indicated.

References Cited in the file of this patent

UNITED STATES PATENTS

| | | |
|---|---|---|
| 2,252,750 | Basch | Aug. 19, 1941 |
| 2,349,482 | Welty | May 23, 1944 |
| 2,604,392 | Brown | July 22, 1952 |
| 2,645,461 | Brown | July 14, 1953 |